United States Patent
Malta et al.

(10) Patent No.: US 9,902,506 B2
(45) Date of Patent: Feb. 27, 2018

(54) USING AIRCRAFT DATA RECORDED DURING FLIGHT TO PREDICT AIRCRAFT ENGINE BEHAVIOR

(71) Applicant: General Electric Company, Schenectady, NY (US)

(72) Inventors: Lucas R Malta, Rio de Janeiro (BR); Bruno Paes Leao, Rio de Janeiro (BR); Jose Luiz Bittencourt, Rio de Janeiro (BR); Leonardo Poubel Orenstein, Rio de Janeiro (BR)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/066,785

(22) Filed: Mar. 10, 2016

(65) Prior Publication Data

US 2017/0259944 A1 Sep. 14, 2017

(51) Int. Cl.
*G06Q 50/30* (2012.01)
*B64F 5/00* (2017.01)
*G05B 23/02* (2006.01)

(52) U.S. Cl.
CPC ........ *B64F 5/0045* (2013.01); *G05B 23/0254* (2013.01)

(58) Field of Classification Search
CPC ... B64F 5/0045; B06Q 50/30; H04B 7/18506; G08G 5/0039; G01C 23/005
USPC ........... 701/3, 14, 33; 340/3.3, 3.5, 531, 945
See application file for complete search history.

(56) References Cited

U.S. PATENT DOCUMENTS 6,148,179 A * 11/2000 Wright ................. G08G 5/0013
340/531
6,160,998 A * 12/2000 Wright ............... H04B 7/18506
340/945
6,163,681 A * 12/2000 Wright ............... H04B 7/18506
340/945

(Continued)

FOREIGN PATENT DOCUMENTS

GB 2450241 A 12/2008
WO 2015/052408 A1 4/2015

OTHER PUBLICATIONS

Mott et al., Similarity-Based Modeling of Aircraft Flight Paths, 2004, IEEE, p. 1580-1593.*

(Continued)

*Primary Examiner* — McDieunel Marc
(74) *Attorney, Agent, or Firm* — John P. Darling (57) ABSTRACT

Historical aircraft data recorded during flight associated with a plurality of aircraft engines and a plurality of prior aircraft flights is accessed and metrics from the aircraft data recorded during flight is automatically calculated on a per-flight basis, and a probabilistic model is employed to capture and represent relationships based on the calculated metrics, the relationships including a plurality of engine parameters and flight parameters. Conditional probability distributions are then calculated for a particular aircraft engine during a potential or historical aircraft flight based on the probabilistic model, engine parameter values associated with the particular aircraft engine, and flight parameter values associated with the potential or historical aircraft flight, and indications associated with the calculated conditional probability distributions are displayed.

6 Claims, 8 Drawing Sheets

(56) References Cited

U.S. PATENT DOCUMENTS

| | | | | |
|---|---|---|---|---|
| 6,167,238 A | * | 12/2000 | Wright | H04W 52/283 340/3.3 |
| 6,167,239 A | * | 12/2000 | Wright | H04B 7/18506 340/945 |
| 6,173,159 B1 | * | 1/2001 | Wright | H04B 7/18506 340/3.5 |
| 7,206,674 B1 | * | 4/2007 | Statler | G06Q 50/30 244/184 |
| 8,165,826 B2 | | 4/2012 | Schimert et al. | |
| 8,437,904 B2 | | 5/2013 | Mansouri et al. | |
| 8,600,917 B1 | | 12/2013 | Schimert et al. | |
| 9,310,222 B1 | * | 4/2016 | Suiter | G01C 23/005 |
| 2015/0279218 A1 | * | 10/2015 | Irrgang | G08G 5/0039 701/3 |
| 2015/0324501 A1 | | 11/2015 | Desell et al. | |

OTHER PUBLICATIONS

Gao, You et al., "Prediction of Aero-Engine Exhaust Gas Temperature Based on Chaotic Neural Network Model", vol. 176, Advances in Mechanical and Electronic Engineering, LNEE 176, 2012, (pp. 145-150, 6 total pages).

Kumar, Amar et al., "Prediction of Exhaust Gas Temperature in GTE by Multivariate Regression Analysis and Anomaly Detection", Electrical and Computer Engineering (CCECE), 2014, IEEE 27th Canadian Conference, (pp. 1-6, 6 total pages).

Martinez-Arellano, Giovanna et al., "Prediction of Jet Engine Parameters for Control Design using Genetic Programming", 2014, UKSim-AMSS 16th International Conference on Computer Modelling and Simulation, DOI: 10.1109/UKSim.2014.64, (pp. 45-50, 6 total pages).

Schimert, James et al., "Coupling a Dynamic Linear Model with Random Forest Regression to Estimate Engine Wear", Annual Conference of the Prognostics and Health Management Society, 2010, (pp. 1-13, 13 total pages).

Mugtussidis, Iossif B., "Flight Data Processing Techniques to Identify Unusual Events", Dissertation submitted to the faculty of Virginia Polytechnic Institute and State University, Jun. 2000, 160pgs.

D. A. Clifton, "Novelty Detection with Extreme Value Theory in Jet Engine Vibration Data," Thesis, St. Cross College, University of Oxford, Department of Engineering Science, pp. 1-244, 2009.

EP17159586 Search Report, dated Jul. 13, 2017.

* cited by examiner

USING AIRCRAFT DATA RECORDED DURING FLIGHT TO PREDICT AIRCRAFT ENGINE BEHAVIOR

BACKGROUND

Sensors may measure various aircraft engine parameters. For example, a sensor may measure the temperature of exhaust gas as it leaves a turbine. This information may be used to facilitate the operation and maintenance of aircraft engines. In some cases, exhaust gas temperatures may be used to determine when an aircraft engine should be serviced. For example, exhaust gas temperature may be a key metric for deciding when an aircraft engine should be removed from an aircraft for servicing and maintenance procedures. When a particular engine's exhaust gas temperature exceeds a pre-determined limit a certain number of times, the engine may be removed from the aircraft for safety reasons—and this can result in substantial costs for engine and/or aircraft owner.

Currently, an engine and/or aircraft owner may attempt try to avoid or reduce exhaust gas temperature exceedances by manually making decisions and taking actions such as assigning more degraded engines to certain airport-pairs (e.g., to avoid high external temperatures or short runways). This type of manual approach, which is generally based on operator knowledge and his or her past experiences, can be a very time consuming and error prone process. Automatically predicting if exhaust gas temperature will exceed a certain threshold for a given engine and external conditions may provide significant economic and safety improvements. It would therefore be desirable to provide systems and methods to facilitate exhaust gas temperature exceedance predictions in an automatic and accurate manner.

DETAILED DESCRIPTION

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

Figure 1:
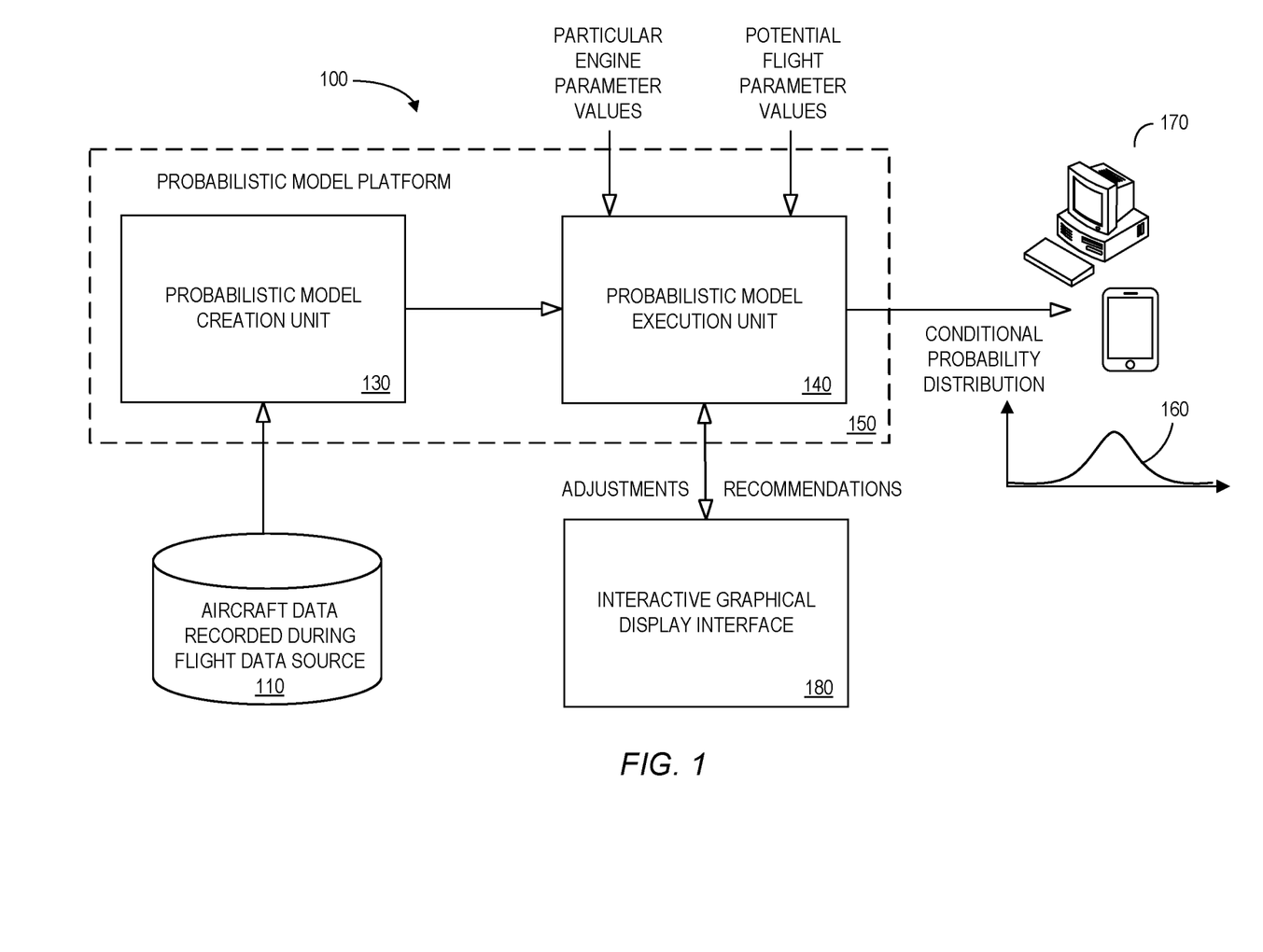
FIG. 1 is a high-level architecture of a system in accordance with some embodiments.

FIG. 1 is a high-level architecture of a system 100 in accordance with some embodiments. The system 100 includes an aircraft data recorded during flight data source 110 that provides information to a probabilistic model platform 150. Data in the data source 110 might include, for example, historic engine sensor information about a number of different aircraft engines and prior aircraft flights (e.g., external temperatures, exhaust gas temperatures, engine model numbers, takeoff and landing airports, etc.).

The probabilistic model platform 150 may, according to some embodiments, access the data source 110, and utilize a probabilistic model creation unit 130 to automatically create a predictive model that may be used by a probabilistic model execution unit 140 to generate a conditional probability distribution 160 (e.g., associated with a likelihood of exceeding a particular exhaust gas temperature threshold) that may be transmitted to various user platforms 170 as appropriate (e.g., for display to a user). As used herein, the term "automatically" may refer to, for example, actions that can be performed with little or no human intervention.

As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The probabilistic model platform 150 may store information into and/or retrieve information from various data sources, such as the aircraft data recorded during flight data source 110 and/or user platforms 170. The various data sources may be locally stored or reside remote from the probabilistic model platform 150. Although a single probabilistic model platform 150 is shown in FIG. 1, any number of such devices may be included. Moreover, various devices described herein might be combined according to embodiments of the present invention. For example, in some embodiments, the probabilistic model platform 150 and one or more data sources might comprise a single apparatus. The probabilistic model platform 150 function may be performed by a constellation of networked apparatuses, in a distributed processing or cloud-based architecture.

Figure 2:
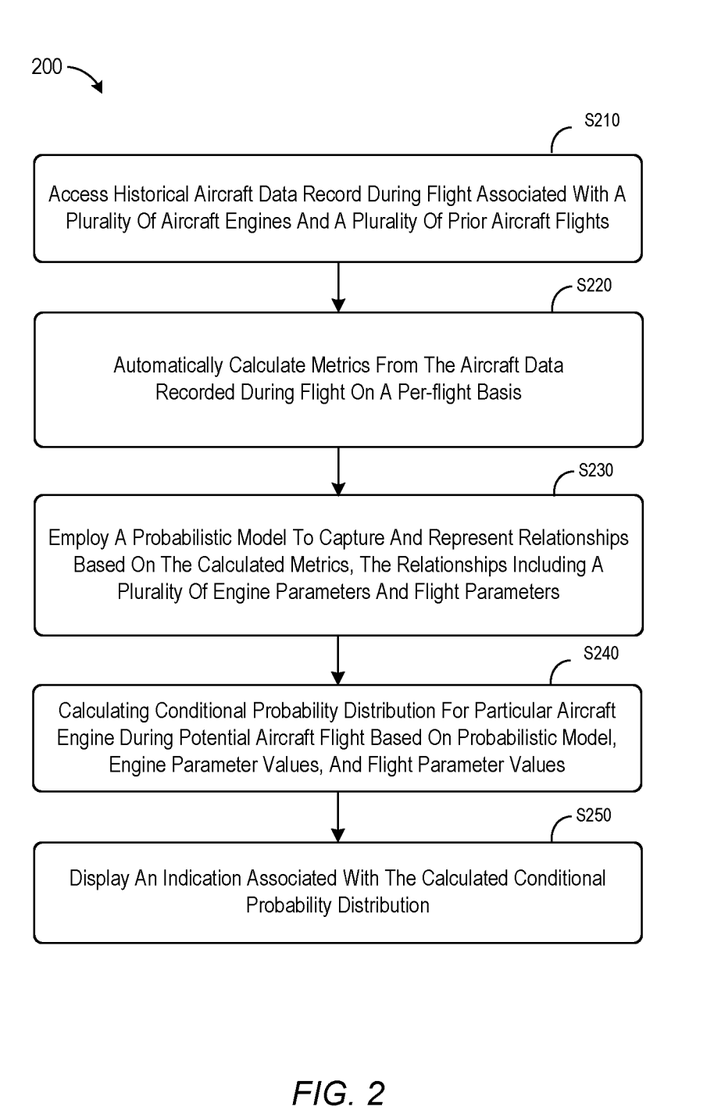
FIG. 2 illustrates a method that might be performed according to some embodiments.

A user may access the system 100 via one of the user platforms 170 (e.g., a personal computer, tablet, or smartphone) to view information about and/or manage the probabilistic model in accordance with any of the embodiments described herein. According to some embodiments, an interactive graphical display interface 180 may let an operator define and/or adjust certain parameters and/or provide or receive automatically generated recommendations (e.g., to improve aircraft engine behavior). For example, FIG. 2 illustrates a method 200 that might be performed by some or all of the elements of the system 100 described with respect to FIG. 1. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a signal processing unit may access historical aircraft data recorded during flight associated with a plurality of aircraft engines and a plurality of prior aircraft flights (e.g., from an aircraft data recorded during flight database).

At S220, metrics may be automatically calculated from the aircraft data recorded during flight on a per-flight basis. According to some embodiments, metrics are further automatically calculated on a per-airport basis, a per-engine type basis, a per-engine model basis, a per-aircraft type basis, and/or a per-aircraft model basis.

At S230, the system may automatically employ a probabilistic model to capture and represent relationships based on the calculated metrics. The relationships may include, for example, a number of different engine parameters and flight parameters. According to some embodiments, the probabilistic model comprises a Gaussian mixture model. As used herein, the phrase "engine parameter" might refer to, for example, engine degradation information, an engine type, and/or an engine model.

At S240, the system may calculate a conditional probability distribution for a particular aircraft engine during a potential aircraft flight based on the probabilistic model, engine parameter values associated with the particular aircraft engine, and flight parameter values associated with the potential aircraft flight. Note that the calculation of the conditional probability distribution might be further associated with a rule-based model, a physics-based model, a data-driven model, a statistical model, and/or artificial intelligence model (e.g., in addition to and/or instead of the Gaussian mixture model).

At S250, information may be transmitted (e.g., via a communication port coupled to the signal processing unit) to render a display of an indication associated with the calculated conditional probability distribution. According to some embodiments, the conditional probability distribution represents a likelihood that an exhaust gas temperature value will exceed a maximum threshold value during the potential aircraft flight.

According to some embodiments, the system may further automatically generate a recommended adjustment to at least one of an engine parameter value and a flight parameter value based on the conditional probability distribution for the particular aircraft engine during the potential aircraft flight. For example, the system might automatically recommend that a particular engine not be flown when the external temperature exceeds a particular value.

Figure 3:
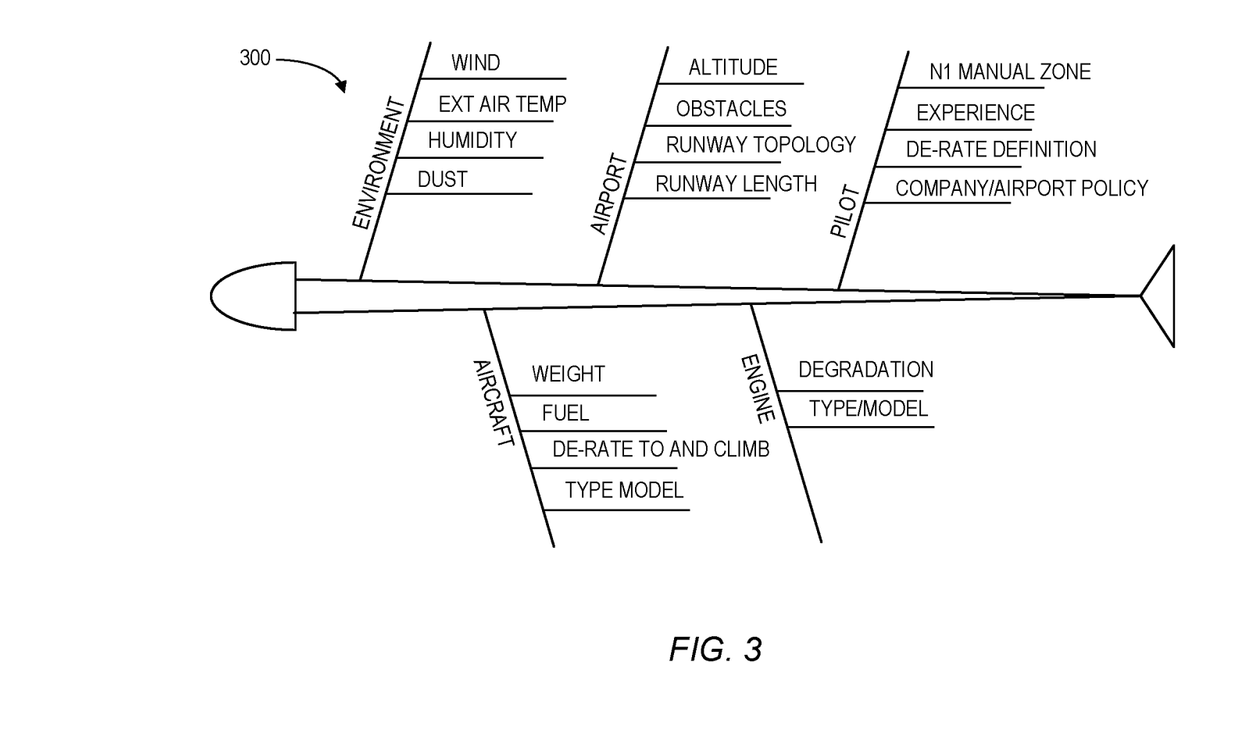
FIG. 3 illustrates some factors that influence exhaust gas temperature in accordance with some embodiments.

FIG. 3 illustrates some factors that influence exhaust gas temperature 300 in accordance with some embodiments. According to some embodiments, the flight parameters 300 may be associated with environment information, such as wind information, an external air temperature, humidity information, and/or dust information. According to other embodiments, the flight parameters 300 may be associated with aircraft information, such as gross weight information, aircraft weight, fuel weight, passenger and baggage weight, de-rated takeoff information, de-rated climb information, an aircraft type, and/or an aircraft model. According to still other embodiments, the flight parameters 300 may be associated with airport information, such as an altitude, obstacle clearance information, runway topology, a runway length, a takeoff airport, and/or a landing airport. In still other embodiments, the flight parameters 300 might be associated with pilot information, such as de-rated definition information, a company policy, an airport policy, an amount of experience (e.g., a number of years, a number of flights, a number of miles flown, etc.), and/or N1 manual zone information. Note that embodiments may combine some or all of these examples of "flight parameters" 300 and/or other types of flight parameters (e.g., hundreds of different parameters) in connection with the Gaussian mixture model along with one or more engine parameters, such as engine degradation information, an engine type, and/or an engine model. By way of example, the system may capture the following data:

P(EGT, Environment, Aircraft, Airport, Engine, Pilot)

where EGT equals the exhaust gas temperature. In this case, a potential use of the data might comprise calculating:

P(EGT|Environment, Aircraft, Airport, Engine, Pilot)

Figure 4:
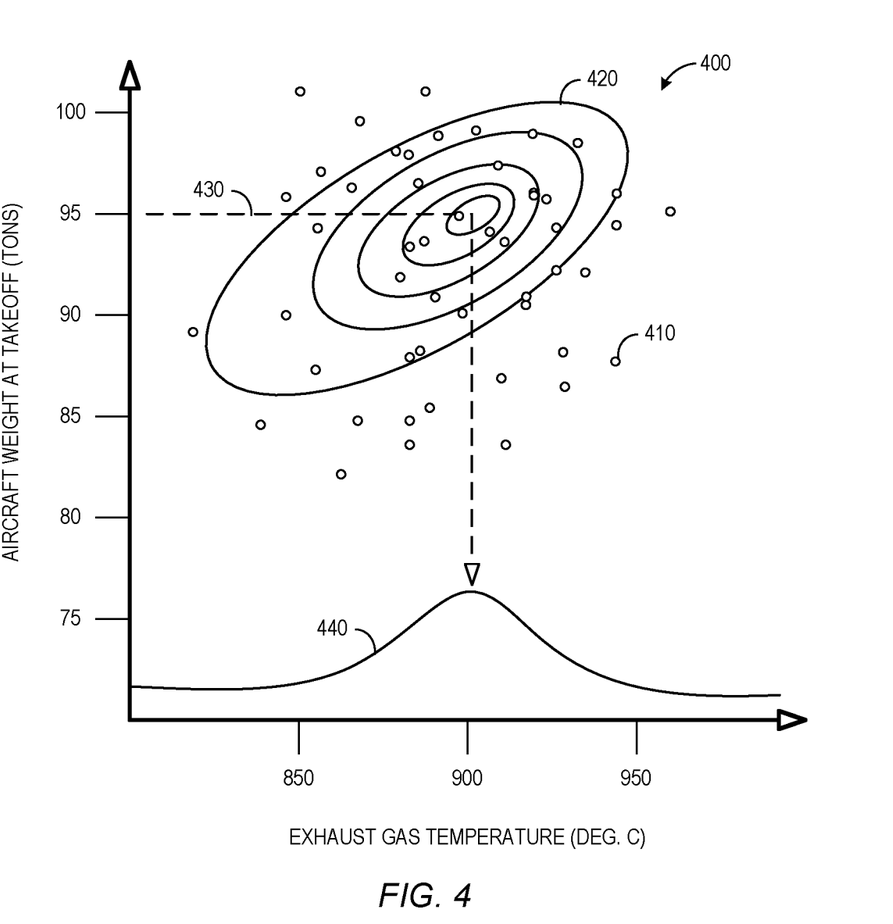
FIG. 4 illustrates a Gaussian mixture model and data points representing various engines and conditions according to some embodiments.

This information may be used in connection with modeling and calculation of exhaust gas temperature probability distribution given an independent variable, such as aircraft weight at takeoff. FIG. 4 illustrates 400 a Gaussian mixture model 420 and data points 410 representing various engines and conditions according to some embodiments. The data points 410 represent an exhaust gas temperature (in degrees Celsius along the X axis) plotted with respect to aircraft weight at takeoff (in tons along the Y axis) for a given airport. Although a limited number of data points 410 are displayed in FIG. 4 for clarity, note that embodiments may include any number of data points 410 (e.g., tens of thousands of data points 410). Also note that each data point 410 may represent a flight from various engines and conditions. The distribution might be associated with, for example, how a specific airline operates.

The Gaussian mixture model 420 may be used to represent the data as follows:

P(EGT, Weight|Airport=XYZ)

which may correspond to a huge decrease in the number of data points 410 the system may need to store. For example, wherein the aircraft weight at takeoff is 95 tons (as illustrated by the dashed line 430 in FIG. 4):

P(EGT|Airport=SDU, Weight=95)

decision making may be supported such that the probability 440 of exceeding a threshold exhaust gas temperature of 900° C. is about 50% (and a decision may be made as to whether the weight of the aircraft should be reduced).

Another application of the proposed model consists of supporting the investigation of root cause for past events when exhaust gas temperature exceeded a certain threshold value. Given n parameters ($x_i$, i=1, 2, . . . , n) in the model associated to EGT, n weights ($w_j$, j=1, 2, . . . , n) may be calculated according to the equations below. The parameters used in the calculation are those corresponding to the specific event under consideration. Weight $w_j$ is associated to the importance of parameter $x_j$ in the occurrence of the event. The greater the weight, the greater the corresponding parameter importance. Therefore, evaluation and comparison of such weights may provide information about the probable root causes of the event:

$$X = [x_k], k \in \{1, 2, \ldots, n\}$$

$$X_j = [x_k], k \in \{1, 2, \ldots, n\} - \{j\}$$

$$w_j = \frac{p(EGT > EGT_{max} \mid X)}{p(EGT > EGT_{max} \mid X_j)}$$

Figure 5:
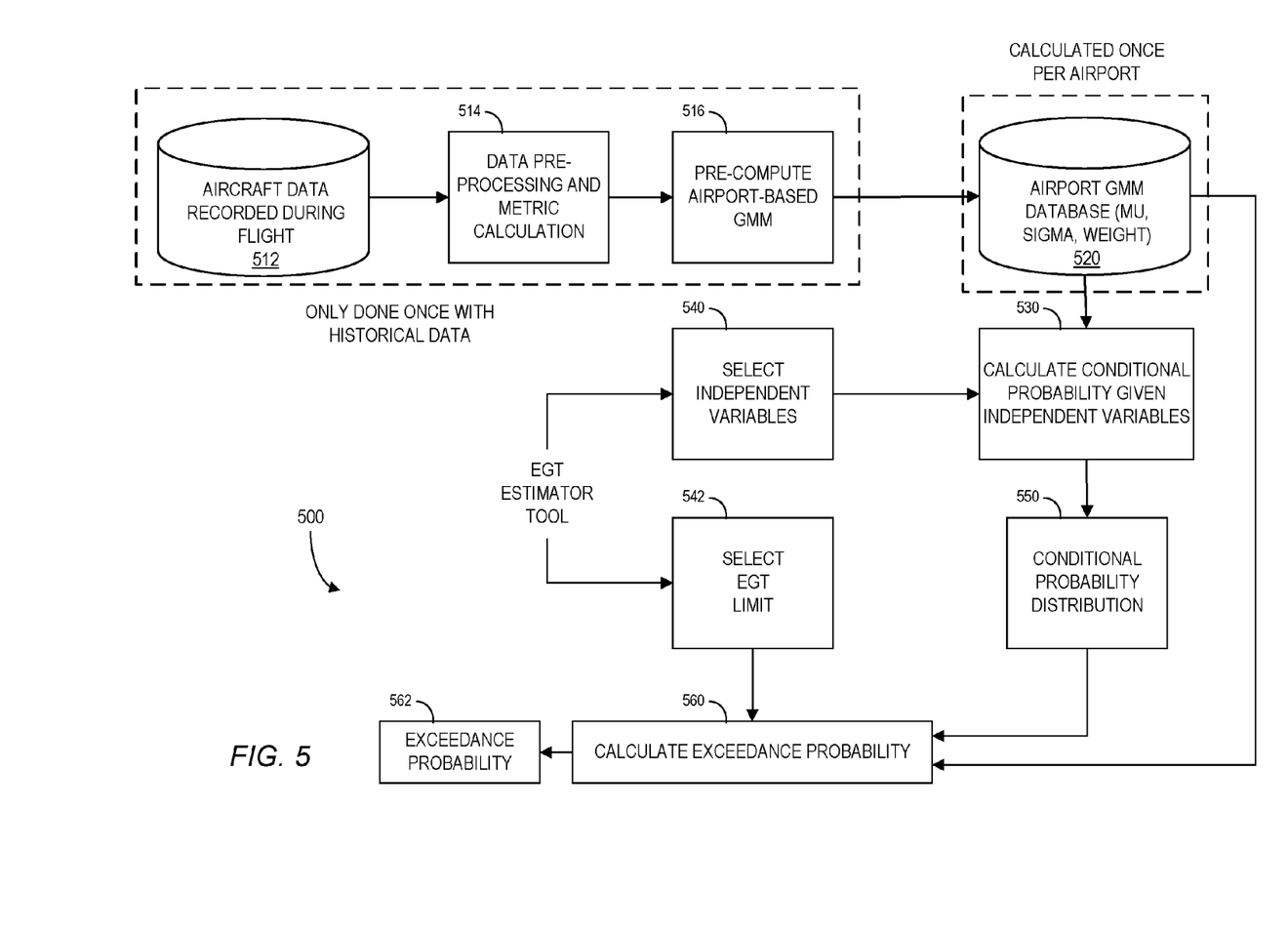
FIG. 5 is a system diagram in accordance with some embodiments.

FIG. 5 is a system diagram 500 in accordance with some embodiments. In particular, a data pre-processing and metric calculation 514 may receive aircraft data recorded during flight 512 and provide a result to a pre-compute airport-based Gaussian mixture model 516. Note that this might be performed only once with historical data (but could be updated in case of major changes in airline operation). An airport Gaussian mixture model database (mu, sigma, weight) 520 (with one model being calculated per-airport) may provide an output to calculate conditional probability given independent variables 530 (which might, for example, be selected 540 via an exhaust gas temperature calculator tool) to generate a conditional probability distribution 550. The conditional probability distribution 550 may be used (along with information from the airport Gaussian mixture model database 520 and an exhaust gas temperature 542 selected via the estimator tool) by an exceedance probability calculation 560 to generate an exceedance probability 562.

In this way, a probabilistic model may be created to support an airline's decision making process regarding aircraft engine use and/or assignment. The system may employ Gaussian mixture models to capture the relationship between exhaust gas temperature and other variables calculated from historical aircraft data recorded during flight. This relationship may then be used to derive the probability of exhaust gas temperature exceedance given other variables that the airline has the ability to change. As a result, time-on-wing may be increased through data analytics, bringing cost avoidance and less disruptions to the airline. Note that embodiments may use historical aircraft data recorded during flight to model maximum exhaust gas temperature airborne and its relationship to variables that might impact exceedance. These variables might be, for example, airport-related, aircraft-related, environment-related, engine-related, and/or pilot-related (e.g., aircraft weight, engine degradation, runway length, pilot experience, external temperature, etc.).

The process may involve the calculation of metrics from aircraft data recorded during flight. These metrics may be, for example, calculated on a per-flight basis. The system may then employ Gaussian mixture models to capture and represent relationships, which may drastically reduce the number of parameters needed to be stored. Once a probabilistic model is created, the system may calculate a conditional probability distribution of maximum exhaust gas temperature given the variables that affect its exceedance (e.g., parameters known in advance) and, from this distribution, the system may obtain a probability of exhaust gas temperature exceeding a given threshold.

By changing the independent variables that affect exhaust gas temperature exceedance, an operator may receive a different exceedance probability, which can guide an airline with respect to the decision making process and potentially increase time-on-wing for aircraft engines. That is, exhaust gas temperature is a key metric for deciding when to remove an aircraft engine removal, and when the number of exhaust gas temperature exceedances overcomes a certain threshold, the engine needs to be removed for safety reasons (generating costs). Incorporating embodiments described herein, an airline may have the ability to make decisions based on actual data (rather than operator knowledge) giving the airline an ability to act proactively. This may considerably reduce the number of exhaust gas temperature exceedances (avoiding costs). Note that probabilistic models may be very robust given the abundance of aircraft data recorded during flight, and the use of historical data may make the models very close to the real-world operation and the processing time may be short because the models can be pre-calculated.

Once an airline knows that the exhaust gas temperature exceedance probability is high, it might act proactively by, for example: restricting the maximum weight the aircraft could transport, re-assigning the engine under investigation to a different airport with smaller exceedance probability, restrict takeoffs to certain run-ways, restrict takeoffs to certain wind conditions, enforce de-rate, restrict engine use to certain pilots, and/or change any other variable affecting exhaust gas temperature exceedance guided by the probability calculated using embodiments described herein. Note that some or all of the steps might be automatically recommended by the system in view of the appropriate data.

Figure 6:
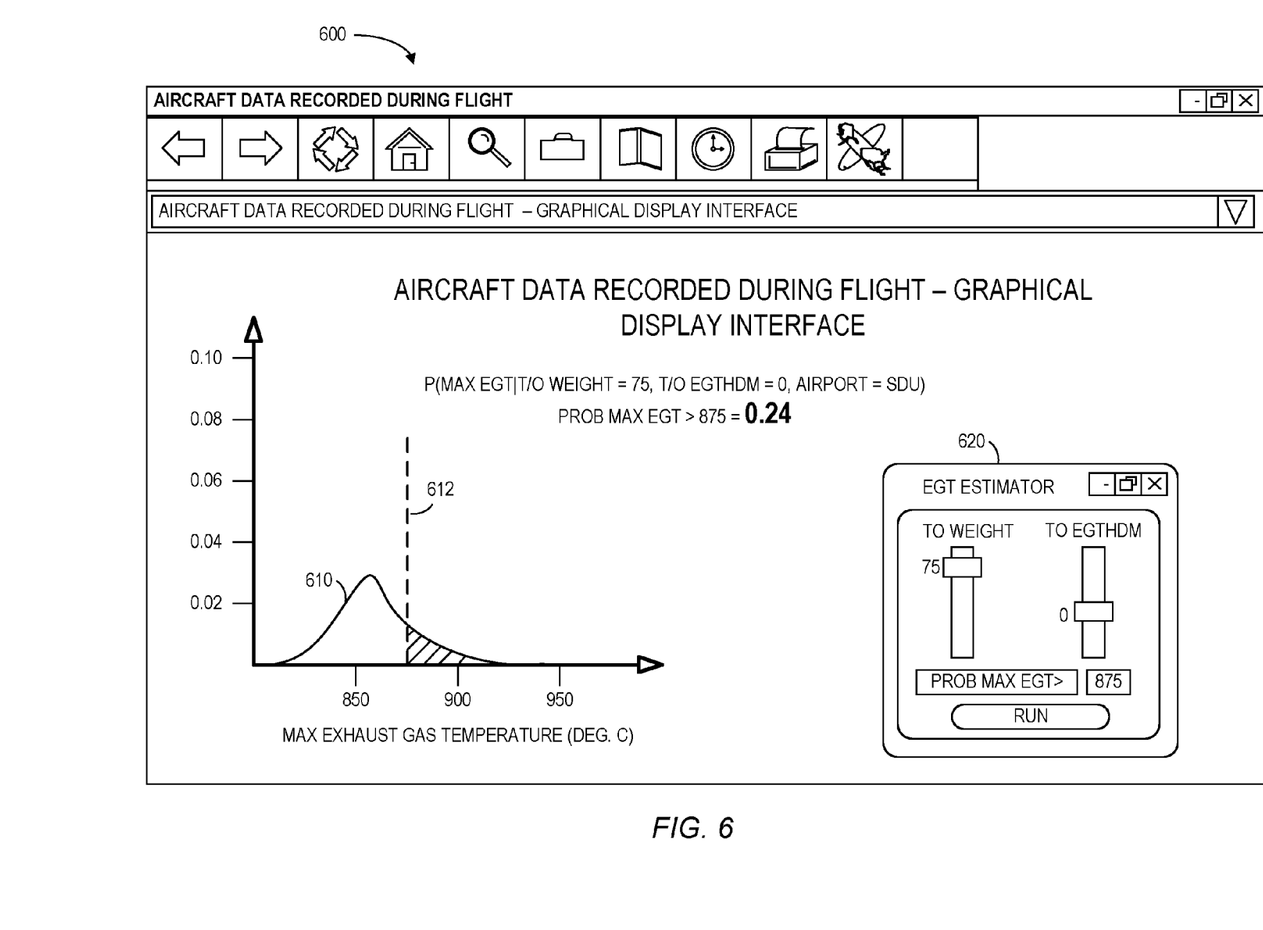
FIG. 6 illustrates an interactive graphical user interface display according to some embodiments.

According to some embodiments, the system may receive, from an operator via an interactive graphical display interface, an adjustment to at least one of an engine parameter value and a flight parameter value. The system may then re-calculate the conditional probability distribution for the particular aircraft engine during the potential aircraft flight based on the probabilistic model in accordance with the adjustment and display an indication associated with the re-calculated conditional probability distribution. For example, FIG. 6 illustrates an interactive graphical user interface display 600 according to some embodiments. The display 600 may be associated with an algorithm that calculates a conditional probability 610 of exhaust gas temperature given the independent variables and the likelihood of exhaust gas temperature being larger than a selected limit (e.g., 875° C. as illustrated by the dashed line 612 in FIG. 6):

P(MAX EGT|T/O Weight=75, T/O egthdm=0, airport=SDU)

where the value Prob(MAX EGT>875° C.)=0.24 is illustrated by the shaded area under the conditional probability 610 in FIG. 6.

The display 600 further includes an exhaust gas temperature estimator 620 having sliders that can be adjusted by an operator to change takeoff weight and takeoff EGT margins as desired. EGT margins consist of standard metrics associated to engine performance. One example is EGT Hot Day Margin (EGTHDM), which considers the worst case operating scenario in terms of reaching and EGT exceedance. The estimator 620 further includes an input box where the operator can enter an exhaust gas temperature (e.g., 875° C.) and a "Run" icon to begin execution of the algorithm (and a rending of the results on the display 600).

Figure 7:
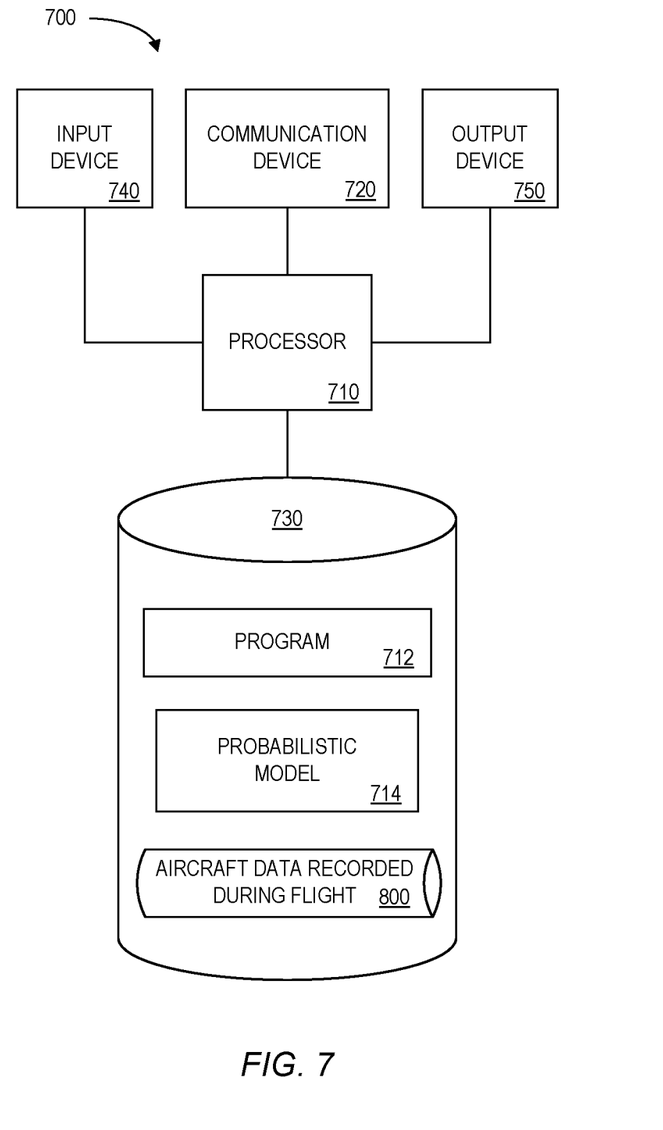
FIG. 7 is block diagram of a probabilistic model platform according to some embodiments of the present invention.

The embodiments described herein may be implemented using any number of different hardware configurations. For example, FIG. 7 is block diagram of a probabilistic model platform 700 that may be, for example, associated with the system 100 of FIG. 1 and/or the system diagram 500 of FIG. 5. The probabilistic model platform 700 comprises a processor 710, such as one or more commercially available Central Processing Units ("CPUs") in the form of one-chip microprocessors, coupled to a communication device 720 configured to communicate via a communication network (not shown in FIG. 7). The communication device 720 may be used to communicate, for example, with one or more remote user platforms. The probabilistic model platform 700 further includes an input device 740 (e.g., a computer mouse and/or keyboard to input adaptive and/or predictive modeling information) and/an output device 750 (e.g., a computer monitor to render display, transmit recommendations, and/or create reports). According to some embodiments, a mobile device and/or personal computer may be used to exchange information with the probabilistic model platform 700.

The processor 710 also communicates with a storage device 730. The storage device 730 may comprise any appropriate information storage device, including combinations of magnetic storage devices (e.g., a hard disk drive), optical storage devices, mobile telephones, and/or semiconductor memory devices. The storage device 730 stores a program 712 and/or a probabilistic model 714 for controlling the processor 710. The processor 710 performs instructions of the programs 712, 714, and thereby operates in accordance with any of the embodiments described herein. For example, the processor 710 may receive historical aircraft data recorded during flight associated with a plurality of aircraft engines and a plurality of prior aircraft flights. Metrics from the aircraft data recorded during flight may be automatically calculated by the processor 710 on a per-flight basis, and a probabilistic model may be employed by the processor 710 to capture and represent relationships based on the calculated metrics, the relationships including a plurality of engine parameters and flight parameters. A conditional probability distribution may then be calculated by the processor 710 for a particular aircraft engine during a potential aircraft flight based on the probabilistic model, engine parameter values associated with the particular aircraft engine, and flight parameter values associated with the potential aircraft flight, and an indication associated with the calculated conditional probability distribution may be displayed.

The programs 712, 714 may be stored in a compressed, uncompiled and/or encrypted format. The programs 712, 714 may furthermore include other program elements, such as an operating system, clipboard application, a database management system, and/or device drivers used by the processor 710 to interface with peripheral devices.

As used herein, information may be "received" by or "transmitted" to, for example: (i) the probabilistic model platform 700 from another device; or (ii) a software application or module within the probabilistic model platform 700 from another software application, module, or any other source.

In some embodiments (such as the one shown in FIG. 7), the storage device 730 further stores an aircraft data recorded during flight database 800. An example of a database that may be used in connection with the probabilistic model platform 700 will now be described in detail with respect to FIG. 8. Note that the database described herein is only one example, and additional and/or different information may be stored therein. Moreover, various databases might be split or combined in accordance with any of the embodiments described herein.

Figure 8:
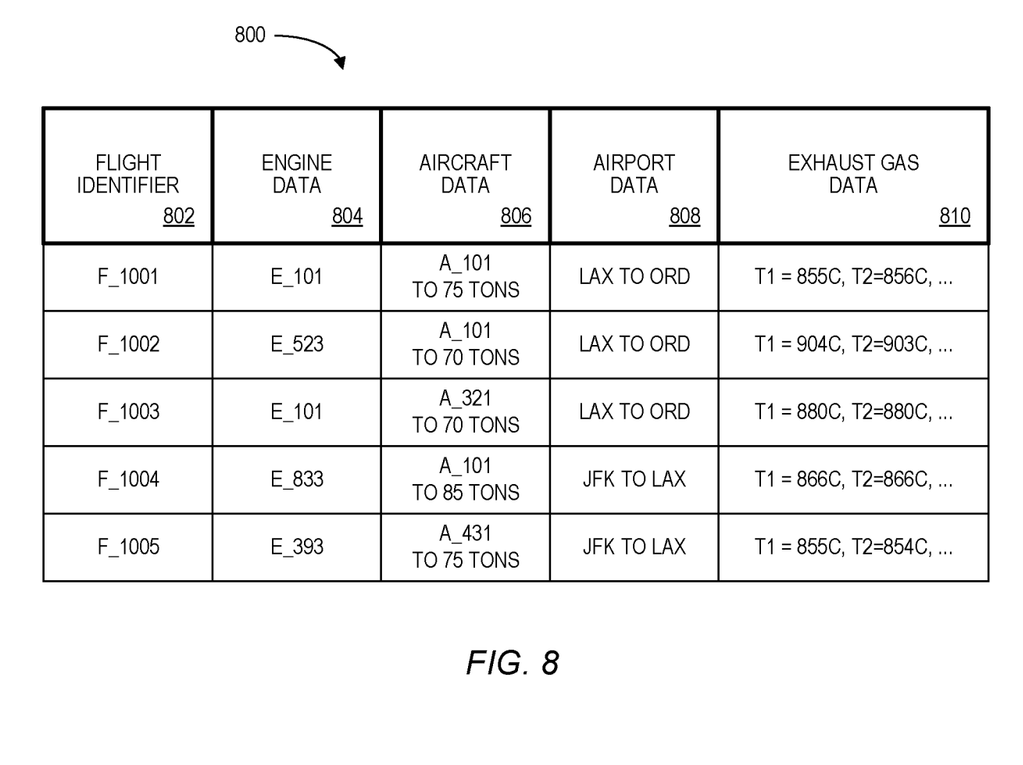
FIG. 8 is a tabular portion of an aircraft data recorded during flight database according to some embodiments.

Referring to FIG. 8, a table is shown that represents the aircraft data recorded during flight database 800 that may be stored at the probabilistic model platform 700 according to some embodiments. The table may include, for example, entries identifying aircraft engines and historic flight data associated with those engines. The table may also define fields 802, 804, 806, 808, 810 for each of the entries. The fields 802, 804, 806, 808, 810 may, according to some embodiments, specify: a flight identifier 802, engine data 804, aircraft data 806, airport data 808 and exhaust gas data 810. The aircraft data recorded during flight database 800 may be created and updated, for example, when data is imported into the system, a new airport is to be modeled, etc.

The flight identifier 802 may be, for example, a unique alphanumeric code identifying a particular aircraft flight that occurred in the past. The engine data 804 might identify a particular engine, a type of engine, an engine model, etc. The aircraft data 806 might identify a particular aircraft, a type of aircraft, an aircraft model, etc. The airport data 808 might identify a particular airport (e.g., with "LAX" representing Los Angeles International Airport) and/or a characteristic of the airport (e.g., runway length, etc.). The exhaust gas data 810 might represent, for example, a series of temperature values that were measured by sensors during the flight associated with the flight identifier 802.

Thus, some embodiments may provide an automatic and efficient way to facilitate exhaust gas temperature exceedance predictions in an accurate manner.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems). For example, although some embodiments are focused on exhaust gas temperature, any of the embodiments described herein could be applied to other key engine factors related to hardware deterioration, such as engine fuel flow.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A method associated with aircraft engines, comprising:
accessing historical aircraft data recorded during flight associated with a plurality of aircraft engines and a plurality of prior aircraft flights;
automatically calculating metrics from the aircraft data recorded during flight on a per-flight basis;
employing a probabilistic model to capture and represent relationships based on the calculated metrics, the relationships including a plurality of engine parameters and flight parameters;
calculating at least one conditional probability distribution for a particular aircraft engine during a potential or historical aircraft flight based on the probabilistic model, engine parameter values associated with the particular aircraft engine, and flight parameter values associated with the potential or historical aircraft flight; and
displaying an indication associated with the at least one calculated conditional probability distribution.

2. The method of claim 1, wherein the at least one conditional probability distribution represents probabilities that an exhaust gas temperature value will exceed a maximum threshold value during the potential aircraft flight.

3. The method of claim 2, wherein the probabilistic model comprises a Gaussian mixture model.

4. The method of claim 3, wherein metrics from the aircraft data recorded during flight are further automatically calculated on at least one of: (i) a per-airport basis, (ii) a per-engine type basis, (iii) a per-engine model basis, (iv) a per-aircraft type basis, and (v) a per-aircraft model basis.

5. The method of claim 1, further comprising:
receiving, from an operator via an interactive graphical display interface, an adjustment to at least one of an engine parameter value and a flight parameter value;
re-calculating the at least one conditional probability distribution for the particular aircraft engine during the potential aircraft flight based on the probabilistic model in accordance with the adjustment; and displaying an indication associated with the re-calculated at least one conditional probability distribution.

6. The method of claim 1, further comprising:

automatically generating a recommended adjustment to at least one of an engine parameter value and a flight parameter value based on the conditional probability distribution for the particular aircraft engine during the potential aircraft flight.

* * * * *